(12) United States Patent
Schultz

(10) Patent No.: US 10,033,317 B2
(45) Date of Patent: Jul. 24, 2018

(54) AUTOMATED MAXIMUM SUSTAINED RATE SYSTEM AND METHOD

(71) Applicant: Florida Power & Light Company, Juno Beach, FL (US)

(72) Inventor: Paul Clarence Schultz, Lake Worth, FL (US)

(73) Assignee: Florida Power & Light Company, Juno Beach, FL (US)

( * ) Notice: Subject to any disclaimer, the term of this patent is extended or adjusted under 35 U.S.C. 154(b) by 0 days.

(21) Appl. No.: 15/294,057

(22) Filed: Oct. 14, 2016

(65) Prior Publication Data

US 2018/0109216 A1    Apr. 19, 2018

(51) Int. Cl.
| F02D 29/06 | (2006.01) |
| H02P 9/04 | (2006.01) |
| H02P 9/00 | (2006.01) |
| F01K 15/00 | (2006.01) |
| F01K 11/02 | (2006.01) |
| F01K 7/16 | (2006.01) |
| F02N 11/06 | (2006.01) |

(52) U.S. Cl.
CPC .............. *H02P 9/04* (2013.01); *F01K 7/165* (2013.01); *F01K 11/02* (2013.01); *F01K 15/00* (2013.01); *H02P 9/008* (2013.01)

(58) Field of Classification Search
USPC .................. 290/40 C, 40 R; 700/287; 60/773
See application file for complete search history.

(56) References Cited

U.S. PATENT DOCUMENTS

| 3,879,616 A * | 4/1975 | Baker ..................... F01K 13/02 290/2 |
| 3,892,975 A * | 7/1975 | Yannone ................... F02C 9/26 290/40 R |
| 3,898,439 A * | 8/1975 | Reed ......................... F02C 9/26 700/287 |
| 3,898,842 A * | 8/1975 | Luongo .................. F01D 17/24 290/40 R |
| 3,911,285 A * | 10/1975 | Yannone ................... F02C 9/32 290/40 R |
| 3,919,623 A * | 11/1975 | Reuther ................... F02C 9/26 290/4 R |
| 3,924,141 A * | 12/1975 | Yannone ................... F02C 7/26 290/38 R |

(Continued)

FOREIGN PATENT DOCUMENTS

| CA | 2793983 A1 | 4/2013 |
| EP | 0432570 A2 | 6/1991 |
| EP | 2885534 A1 | 6/2015 |

*Primary Examiner* — Pedro J Cuevas
(74) *Attorney, Agent, or Firm* — Jeffrey N. Giunta; Fleit Gibbons Gutman Bongini & Bianco P.L.

(57) ABSTRACT

In the context of electric power generation facilities, a system and method that enable control of maximum sustained rate of change in output to accommodate changing load conditions and to facilitate efficient use of system resources are disclosed. In accordance with aspects of the disclosed subject matter, a ramp rate for an electric generator source may be set, operating parameters may be monitored, rates of change or discrepancies of the operating parameters over time may be computed; and output signals may then be used selectively to control certain system components.

16 Claims, 4 Drawing Sheets

(56) References Cited

U.S. PATENT DOCUMENTS

| | | | | |
|---|---|---|---|---|
| 3,939,328 A | * | 2/1976 | Davis | F01D 17/24 290/40 R |
| 3,943,373 A | * | 3/1976 | Yannone | F02C 7/26 290/40 R |
| 4,019,315 A | * | 4/1977 | Yannone | F02C 7/26 290/40 A |
| 4,031,407 A | * | 6/1977 | Reed | H02J 3/42 290/1 R |
| 4,051,669 A | * | 10/1977 | Yannone | F02C 9/32 60/39.091 |
| 4,149,386 A | * | 4/1979 | Luongo | F01D 19/02 60/663 |
| 4,208,591 A | * | 6/1980 | Yannone | F02C 9/28 290/40 R |
| 4,222,229 A | | 9/1980 | Uram | |
| 4,242,592 A | * | 12/1980 | Yannone | F02C 9/56 290/40 R |
| 4,283,634 A | * | 8/1981 | Yannone | F02C 9/26 290/40 R |
| 4,308,463 A | * | 12/1981 | Giras | H02J 3/42 290/40 R |
| 4,314,441 A | * | 2/1982 | Yannone | F02C 9/28 60/39.281 |
| 4,445,180 A | * | 4/1984 | Davis | F01D 17/24 290/40 R |
| 4,455,614 A | * | 6/1984 | Martz | F01K 23/10 290/40 R |
| 4,514,642 A | * | 4/1985 | Ross | F22B 35/008 290/40 A |
| 4,536,126 A | * | 8/1985 | Reuther | H02J 3/42 290/40 R |
| 4,578,944 A | * | 4/1986 | Martens | F01K 23/105 122/7 B |
| 4,589,255 A | * | 5/1986 | Martens | F01D 17/085 60/646 |
| 5,252,860 A | | 10/1993 | McCarty et al. | |
| 5,752,378 A | | 5/1998 | Mirsky et al. | |
| 5,879,133 A | * | 3/1999 | Mirsky | F02C 9/28 417/46 |
| 6,230,479 B1 | | 5/2001 | Kawamura et al. | |
| 6,484,490 B1 | * | 11/2002 | Olsen | F02C 7/22 60/39.281 |
| 7,383,790 B2 | * | 6/2008 | Francino | F22B 1/1846 122/379 |
| 8,200,369 B2 | * | 6/2012 | Cheng | F23N 5/242 700/287 |
| 9,163,828 B2 | | 10/2015 | Beveridge | |
| 2008/0016647 A1 | * | 1/2008 | Francino | F22B 1/1846 15/318.1 |
| 2008/0288198 A1 | * | 11/2008 | Francino | F01K 13/02 702/84 |
| 2009/0012653 A1 | * | 1/2009 | Cheng | F23N 5/242 700/287 |
| 2011/0046752 A1 | * | 2/2011 | Piche | H02J 3/38 700/36 |
| 2012/0040298 A1 | * | 2/2012 | Beveridge | F22G 5/12 432/13 |
| 2012/0040299 A1 | * | 2/2012 | Beveridge | F01K 13/02 432/13 |
| 2012/0122017 A1 | * | 5/2012 | Mills | F01K 23/064 429/504 |
| 2013/0084474 A1 | * | 4/2013 | Mills | H01M 4/9016 429/9 |
| 2013/0110298 A1 | * | 5/2013 | Beveridge | F01K 13/02 700/287 |
| 2016/0040871 A1 | * | 2/2016 | Beveridge | F01K 13/02 700/287 |
| 2016/0160762 A1 | * | 6/2016 | Chandra | F01D 21/003 701/100 |
| 2017/0002692 A1 | * | 1/2017 | Cheng | F01K 13/02 |
| 2017/0090548 A1 | * | 3/2017 | Cheng | G06F 1/3206 |

* cited by examiner

AUTOMATED MAXIMUM SUSTAINED RATE SYSTEM AND METHOD

FIELD OF THE DISCLOSURE

The present disclosure relates generally to ramping output of electrical power generation facilities, and more particularly to a system and method that enable control of maximum sustained rate of change in output to accommodate changing load conditions and to facilitate efficient use of system resources.

BACKGROUND

Conventional electrical power generation systems are generally limited in terms of the rate at which the power generation hardware can transition from one power output level to another; this transition from a first power output level to a second power output level is generally referred to as a "ramp rate." The theoretical limit on ramp rate is affected by the physical characteristics and architectural implementation of the equipment used to generate the electrical power, and may be influenced by a variety of factors including some or all of the following: the size, volumetric capacity, and operating pressures of boilers; the size and operational parameters of steam turbines; the rotational inertia, magnetic characteristics, and efficiency of electric generators; or a combination of these and many other factors.

Additionally, there is generally a latency or lag between a ramp request and system output that corresponds to the output level requested (the "setpoint"). In practical electricity generation applications, there is always a delay between a control input and a power level output that satisfies the level required or requested by the control input. The extent of this latency (i.e., the duration of the lag) is influenced by the factors mentioned above, in addition to others. It takes time for fluid to boil responsive to added heat, it takes time for pressures to increase as a result of expanding fluids, and it takes time for a turbine to accelerate to a steady state in response to increased pressure. Even in the case where a single electricity generator, or a single generation facility, is capable of handling a specific load at steady state, it is often the case that such a single unit cannot ramp fast enough to accommodate instantaneous load demands. Running such a single unit at a higher output level than required at any particular moment (e.g., in anticipation of higher loads in the future) is generally not efficient and undesirable.

Irrespective of any physical, mechanical, or materials science limitations related to the equipment itself (based, for example, on critical pressures or "never-exceed" rotational velocities that might cause mechanical damage or catastrophic system failure), and ignoring any theoretical limitations on ramp rate, equipment manufacturers often limit the rate at which an electricity generation system or apparatus may be stressed; the manufacturers do this via documentation or other product literature suggesting or recommending a maximum sustained rate (or "MSR") for each particular implementation of their products. Such published documentation often takes into account conservative engineering safety margins, wear and tear and associated maintenance costs, the possibility of negligence or abuse on the part of the operating entity, liability insurance premiums, and other factors that combine artificially to reduce the recommended MSR well below the operational capabilities of the equipment itself.

Utility companies have installed and currently operate many electricity generation facilities throughout the country. To satisfy customer demands, many of these facilities either employ a plurality of generators, operate in concert with each other, or both. In accordance with conventional technology and traditional techniques, it is generally necessary to bring more resources on line in the short term to handle transient loads than are necessary to handle the steady state load in the long term. Thus, there is a need for precise, discrete (i.e., per unit) MSR control functionality that provides an improved and enterprise-wide response to transient load demands while making efficient use of local system resources.

BRIEF SUMMARY OF THE DISCLOSURE

The following presents a simplified summary of the disclosure in order to provide a basic understanding of some aspects of the disclosure. This summary is not an extensive overview of the disclosure. It is intended neither to identify key or critical elements of the disclosure nor to delineate the scope of the system and method disclosed herein; its sole purpose is to present some concepts of the disclosure in a simplified form as a prelude to the more detailed description that is presented later.

In accordance with one implementation, a disclosed method generally comprises: setting a ramp rate for an electric source; monitoring operating parameters at components of the source including one or more of a boiler, a steam turbine, an electric generator, and a stack; computing rates of change or discrepancies of the operating parameters over time; and providing output signals as a result of the monitoring and the computing selectively to control one of the boiler, the turbine, or the generator. The operating parameters may include throttle pressure at the boiler, first stage metal temperature at the turbine, megawatt error at the generator, and opacity at the stack. The providing output signals may generally comprise selectively transmitting the output signals to ones of the boiler, turbine, generator, and stack to control the operating parameters, and setting a ramp rate may generally comprise utilizing the output signals selectively to vary the ramp rate based on the operating parameters, and may further comprise utilizing input from a distributed control system component remote from the electric source. In some implementations employing a solar electric power generator, setting a ramp rate may further comprise utilizing input from a solar generator source having a solar unit controller in communication with the distributed control system component.

In accordance with another aspect of the disclosed subject matter, an electric power generation system may generally comprise: a generator source including a boiler, a steam turbine, an electric generator, and a stack, each of the boiler, turbine, generator, and stack comprising an associated control component; and a unit controller in communication with the associated control component at each of the boiler, turbine, generator, and stack; the unit controller configured and operative to perform a method comprising: setting a ramp rate for the generator source, the ramp rate indicative of a change in output level of the generator; receiving data representative of operating parameters from the associated control component at one or more of the boiler, turbine, generator, and stack; computing rates of change or discrepancies of the operating parameters over time; and providing output signals as a result of the receiving and the computing selectively to control one of the boiler, turbine, or generator.

In some such systems, the operating parameters include throttle pressure at the boiler, first stage metal temperature at the turbine, megawatt error at the generator, and opacity at the stack. As with the method disclosed above, providing output signals may generally comprise selectively transmitting the output signals to the associated control component at ones of the boiler, turbine, generator, and stack to control the operating parameters, and setting a ramp rate may comprise utilizing the output signals selectively to vary the ramp rate based on the operating parameters. In some implementations, a system may further comprise an additional generator source, an additional unit controller, and a distributed control system component in communication with the unit controller and the additional unit controller. For such systems, for each of the unit controller and the additional unit controller, setting a ramp rate may generally comprise utilizing input from the distributed control system component. Setting a ramp rate may further comprise utilizing, at the distributed control system component, the output signals from the unit controller selectively to vary the ramp rate at the additional generator source. In systems comprising a solar generator source having a solar unit controller, the distributed control system component may be in communication with the solar unit controller, and setting a ramp rate may generally comprise utilizing input from the solar unit controller.

In accordance with aspects of the disclosed subject matter, a method may generally comprise: employing a plurality of electric power sources, each of the plurality of power sources including a boiler, a steam turbine, an electric generator, a stack, and a unit controller; providing a distributed control system component in communication with the unit controller at each of the plurality of power sources; for each of the of power sources: setting a ramp rate, the ramp rate indicative of a change in output level of the generator; monitoring operating parameters of one or more of the boiler, turbine, generator, and stack; computing rates of change or discrepancies of the operating parameters over time; and providing output signals as a result of the monitoring and the computing selectively to control one of the boiler, the turbine, or the generator; and receiving, at the distributed control system component, responsive to the monitoring, the computing, and the providing, data representative of the operating parameters at each of the plurality of power sources.

As noted above, the operating parameters may generally include throttle pressure at the boiler, first stage metal temperature at the turbine, megawatt error at the generator, and opacity at the stack, and the providing output signals may comprise selectively transmitting the output signals to ones of the boiler, the turbine, the generator, and the stack to control the operating parameters. In operation of some methods, setting a ramp rate may comprise utilizing the output signals selectively to vary the ramp rate based on the operating parameters, and may further comprise utilizing input from the distributed control system component. In some implementations described below, setting a ramp rate for each of the plurality of power sources may generally comprise utilizing the operating parameters from each of the others of the plurality of power sources, and may further comprise maximizing ramp rate for a number of the plurality of power sources necessary to satisfy a steady state load.

The following description and the appended drawing figures set forth certain illustrative aspects of the implementations presented in the disclosure. These aspects are indicative, however, of but a few of the various ways in which the principles of the disclosure may be employed, and the various implementations and arrangements are intended to include all such aspects and their equivalents. Other advantages and novel features will become apparent from the following description when considered in conjunction with the appended drawing figures.

BRIEF DESCRIPTION OF THE DRAWING FIGURES

DETAILED DESCRIPTION

Figure 1:
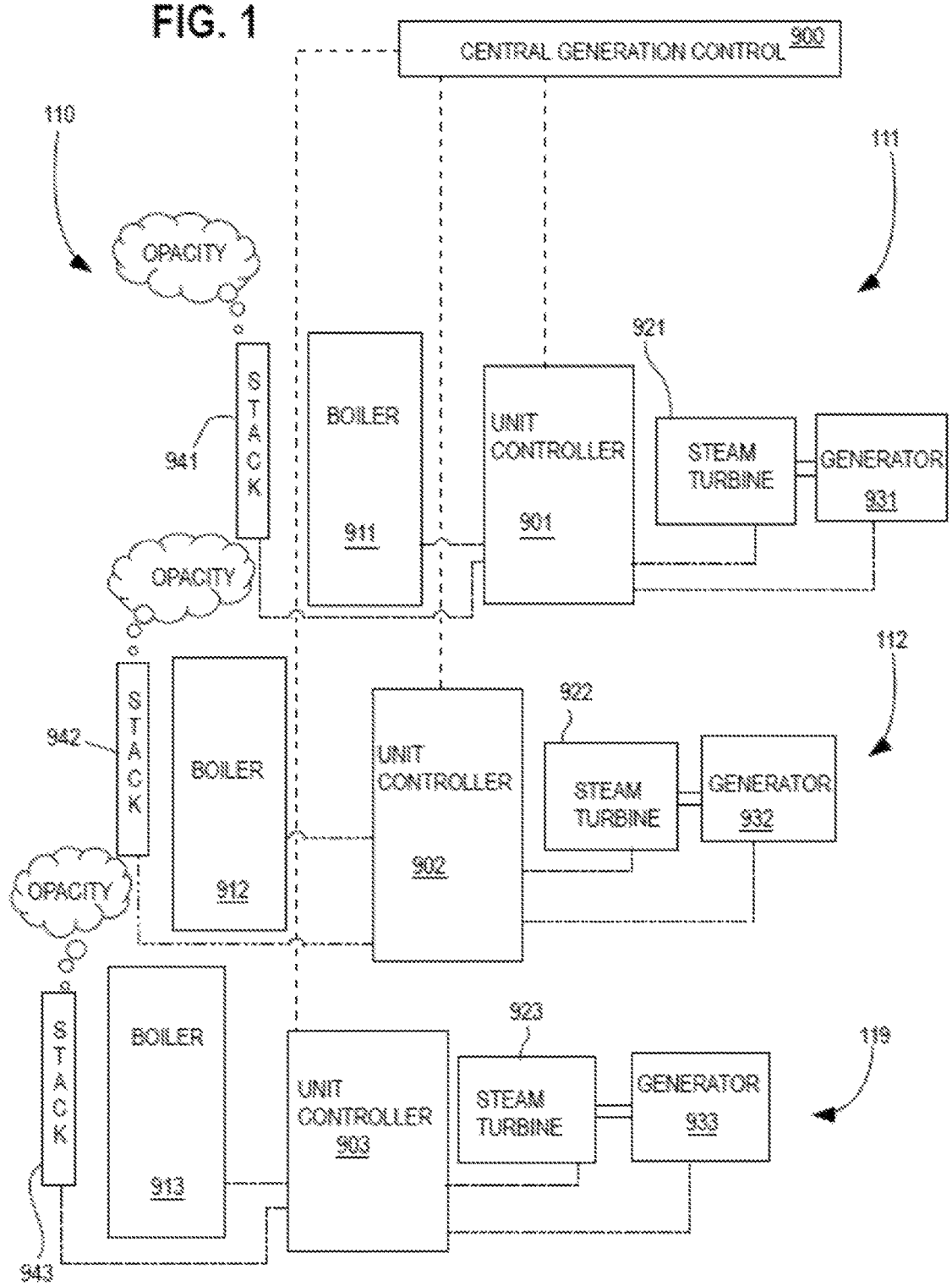
FIG. 1 is a simplified block diagram illustrating components of an automated MSR system operative to perform the disclosed methods.

The following detailed description and the appended drawings describe and illustrate some implementations of a system and method for the purpose of enabling one of ordinary skill in the relevant art to make and use these implementations. As such, the detailed description and drawings are purely illustrative in nature and are in no way intended to limit the scope of the disclosure in any manner. It should also be understood that the drawings are not necessarily to scale and in certain instances details, which are not necessary for an understanding of the disclosure, may have been omitted, such as details of fabrication and assembly. In the accompanying drawings, like numerals represent like components.

As will be appreciated by those skilled in the art, portions of the present system and method may be implemented as a method, a data processing system, or a computer program product. Accordingly, these portions of the present system and method may be implemented entirely in hardware, entirely in software, or in a combination incorporating both software and hardware aspects. Furthermore, portions of the present system and method may be implemented as a computer program product on a computer-usable storage medium having computer readable program code on the medium. Any suitable computer readable medium may be utilized including, but not limited to, static and dynamic storage devices, hard disks, optical storage devices, and magnetic storage devices. Those arrangements implemented entirely in software may be operative in conjunction with a computer employing or comprising, for example, a microprocessor, a microcontroller, or some other electronic hardware component, that is suitably configured to facilitate the functionality set forth below.

The present system and method are described below with reference to illustrations of methods, systems, and computer program products according to the disclosed implementations. As noted above, it will be understood that individual blocks depicted in the drawing figures, as well as certain combinations of blocks depicted in the drawing figures, may be implemented by computer program instructions, hardware devices, or a combination of both. These computer program instructions may be provided to a processor of a general purpose computer, special purpose computer, or other programmable data processing apparatus to produce or enable a particular machine, such that the instructions, which execute via the processor of the computer or other programmable data processing apparatus, implement the functions specified in the block or blocks, either individually or in combination.

Aspects of the present system and method may be implemented on one or more computing devices, including one or more servers, one or more client terminals, including computer terminals, a combination thereof, or on any of myriad computing devices currently known in the art, including without limitation, personal computers, laptops, notebook or tablet computers, touch pads, multi-touch devices, smart phones, personal digital assistants, other multi-function devices, stand-alone kiosks, etc.

Figure 5:
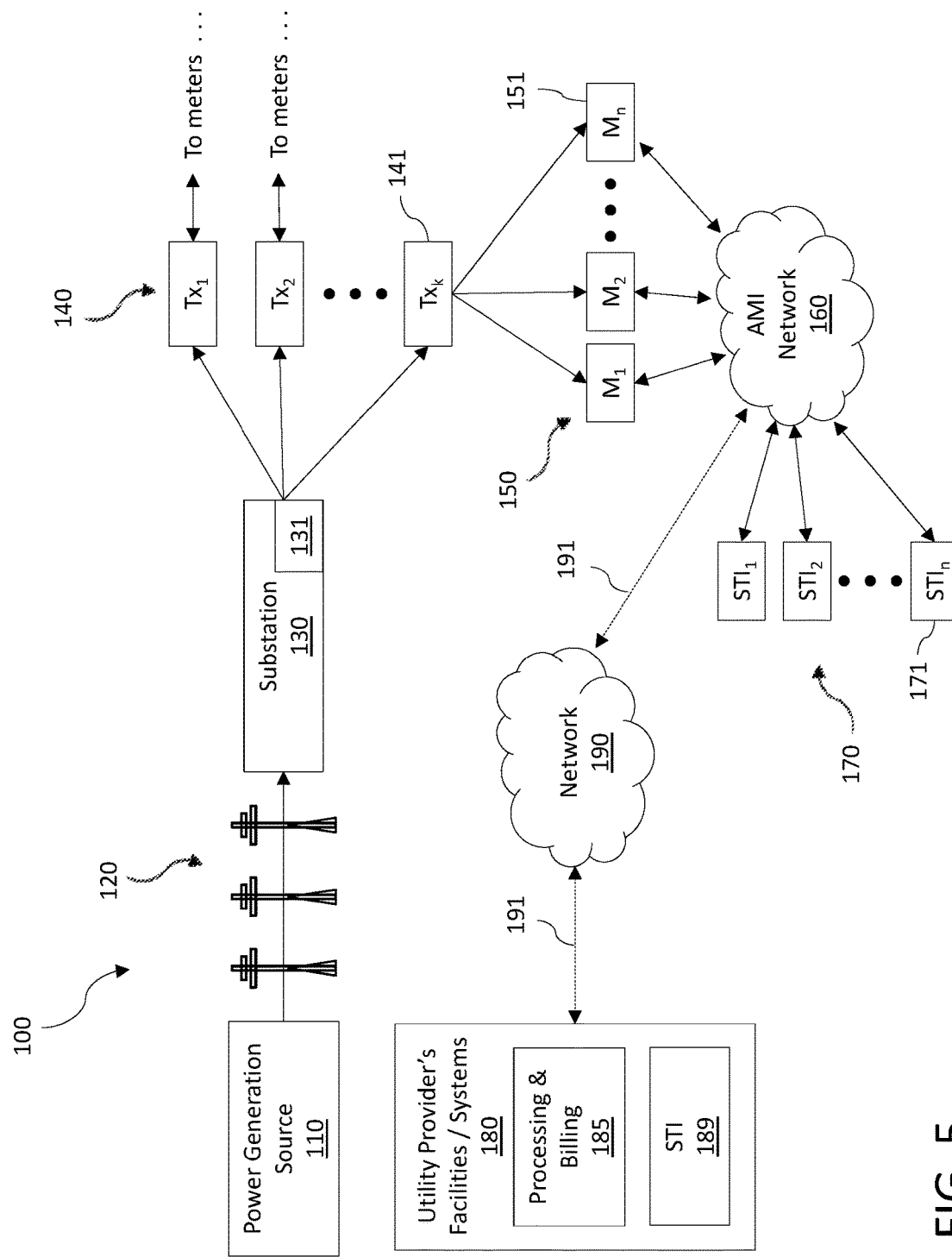
FIG. 5 is a simplified block diagram illustrating components of a metered electric utility distribution system in conjunction with which an MSR system and method may be implemented.

Turning now to the drawing figures, FIG. 5 is a simplified block diagram illustrating components of a metered electric utility distribution system in conjunction with which an MSR system and method may be implemented. As illustrated, a metered electric utility distribution system 100 generally includes a power generation source 110 that is operative to generate electric power in accordance with one or more technologies and to distribute same via transmission lines 120. In that regard, source 110 may employ or included a hydro-electric plant, a fossil fuel or coal-fired plant, a nuclear plant, a wind farm or a solar array or collector and attendant structures, a geothermal plant, or a combination of these and other facilities that are known or developed in accordance with known principles and technologies to generate electric power. Nuclear reactors, steam, gas, or water-driven turbines, rotors, stators, solar panels, cooling towers, and various other ancillary equipment and machinery are omitted from FIG. 5 for clarity, but may be employed at or in cooperation with source 110 as is generally known, and it will be appreciated that these omitted details may be application-specific. In some implementations, transmission lines 120 may carry high-voltage alternating current (or "AC") electric power from source 110 to a desired destination as is generally known, though other technologies for distributing electric power across distances, as may be appropriate for a particular application and based upon technological readiness and suitability, are contemplated. In particular, the present disclosure is not intended to be limited by the structural or operational characteristics of source 110 (except as specifically set forth below) or transmission lines 120, or by the nature of the electric power and the manner in which it is generated or transmitted.

In some practical applications, electric power generated at source 110 may be transmitted via transmission lines 120 to a power transfer substation 130 which, in turn, distributes electric power to transformers ($Tx_1$, $Tx_2$, ... $Tx_n$) 140 for subsequent transmission to metered sites that are generally represented in FIG. 5 as meters ($M_1$, $M_2$, ... $M_n$) 150. It is noted that a metered electric utility distribution system 100 may generally include more substations (such as substation 130) than depicted in FIG. 5, and that each such substation 130 may serve many more transformers (such as transformers 140) than illustrated. Similarly, each such transformer 140, such as specific transformer 141, may provide electric power to more meters (such as meters 150, or specific meter 151) than are depicted in FIG. 5. In that regard, the present disclosure is not intended to be limited by the simplified topography represented in the drawing figures.

In operation, substation 130 may modify or condition the electricity received from source 110 such that it may then be transmitted to transformers 140. For example, it may be desirable in some circumstance to step down (or to step up) voltage via one or more substation transformers 131, or to phase-shift or otherwise to adjust current phase or amplitude, for instance, to achieve a desired power function as specified by the kind of load and/or to minimize energy lost in the distribution system. Various techniques are known or may be developed to condition electric power at substation 130, and the present disclosure is not intended to be limited by the operation of substation 130 or by any technical procedures executed or functionality employed there.

Similarly, transformers 140, in general, and specific transformer 141, in particular, may be configured and operative further to condition the electric power received from substation 130 such that it is suitable for delivery to customers or loads associated with meters 150. Voltage manipulation, current manipulation, or a both, may be employed in various situations; the nature and extent of such conditioning may be dependent upon the specifications and operational characteristics of the meters 150 to which electric power is delivered, for example, or upon governmental regulations, technological or infrastructure capabilities, or a combination of these and other factors. The present disclosure is not intended to be limited by the technologies employed at transformers 140.

Meters 150, in general, and specific meter 151, in particular, may be configured to meter electric power usage at a particular residence, building, business location, or some other specific site. In some circumstances (where available from and supported by a particular utility service provider, for instance, or where required by a state or local utility oversight commission or committee), meters 150, 151 may be operative in accordance with advanced metering infrastructure (or "AMI") specifications or protocols.

In that regard, meters 150, including specific meter 151, may be configured as or include what are generally referred to as "smart meters" or "AMI meters." In operation, when implemented as a smart meter, meters 150, 151 may monitor, sense, record, or otherwise track electrical consumption (or "usage") digitally and at predetermined or dynamically adjustable intervals; subsequently or effectively contemporaneously, meters 150, 151 may transmit usage data (e.g., using a secure radio frequency band or other telecommunications methodology) to other devices installed on or otherwise communicably coupled to the electrical grid or to a communications network (such as AMI network 160) with which meters 150,151 may exchange data. In this context, it will be understood that "usage data" may refer to raw data (i.e., unmodified or unprocessed data as they are collected and that represent the amount of electrical energy consumed at the location metered by meters 150, 151) or to data and other information relating to or derived from such raw data (e.g., readings or data points that may be time-stamped or otherwise processed to provide more information than simply an aggregate or a measure of cumulative consumption). For example, in some instances, an aggregate usage value may be transmitted from such a smart meter, while in other instances, detailed, time-dependent usage rates may be transmitted; the specific type and amount of data collected and processed at, and transmitted from, meters 150, 151 may be application-specific and may vary in accordance with processing or computational capabilities of hardware components deployed in, as well as software functionalities implemented at or in cooperation with, meters 150, 151. These factors may be affected by technological or economic considerations, for example, or may be dictated or influenced by applicable governing bodies or governmental regulations.

As illustrated in FIG. 5, smart meters, such as meters 150, 151, may be communicably coupled to AMI network 160 such that usage data collected (and possibly processed) by meters 150, 151 may be transmitted to AMI network 160.

In operation, AMI network 160 may be communicably coupled to a utility provider's facilities and computer systems (hereinafter generally referred to as "systems" 180). As illustrated in FIG. 5, communication may be enabled or facilitated by a network 190. In this configuration, network 190 may represent the Internet, for instance, or any other packet-switched data network, virtual private network, proprietary or public wide area network ("WAN"), or any other communications network capable of bi-directional data communication between AMI network 160 and systems 180. In some arrangements, it may be desirable to omit network 190 altogether, such that AMI network 160 communicates with systems 180 directly, i.e., without an intervening network, such as network 190; accordingly, the network connections (reference numeral 191) between network 190 and systems 180, on the one hand, and AMI network 160, on the other hand, are illustrated as dashed lines to indicate that such connections may optionally be omitted in some situations.

At a service provider's facilities, systems 180 generally include processing and billing systems 185, as is generally known. In FIG. 5, block 185 represents the various monitoring, customer service, troubleshooting, maintenance, load balancing, accounting, billing, and other types of activities that may be used to operate a utility service. In some instances where such activities are computationally expensive or require a great deal of processor power or communication bandwidth, some implementations of processing and billing systems 185 may be distributed across many processing and memory storage resources, and even distributed across buildings as is generally known in the art. Accordingly, though systems 180 are depicted in FIG. 5 as a single, unified entity, it will be appreciated that block 180 may represent any number of physical buildings, computer server facilities, and other physical and logical resources owned, operated, or otherwise under the control of the relevant utility service provider.

Systems 180 also may include an STI component 189. In operation, STI component 189 may coordinate with processing and billing systems 185, and may share some of the same processing, memory, database, or other hardware resources, for example. As set forth in more detail below, STI component 189 may provide, either independently or in cooperation with other hardware or software components, functionality operative to enable analysis and visualization of disparate data (collected, for example, from devices coupled to AMI network 160) to provide actionable insight.

In some architectures, AMI network 160 may additionally be communicably coupled to STI modules (STI$_1$, STI$_2$, ... STI$_n$) represented in FIG. 5 by reference numeral 170. As noted above, STI modules 170, in general, and specific STI module 171, in particular, may be embodied in or include personal computers, laptops, notebook or tablet computers, touch pads, multi-function devices, and the like. It may be desirable that STI modules 170, 171 provide the same or similar functionality as that provided by STI component 189, though in an environment that is remote from a service provider's systems 180. It is noted that STI modules 170, 171 may readily communicate with STI component 189 via AMI network 160, either independently or in cooperation with network 190 as set forth above.

Figure 2:
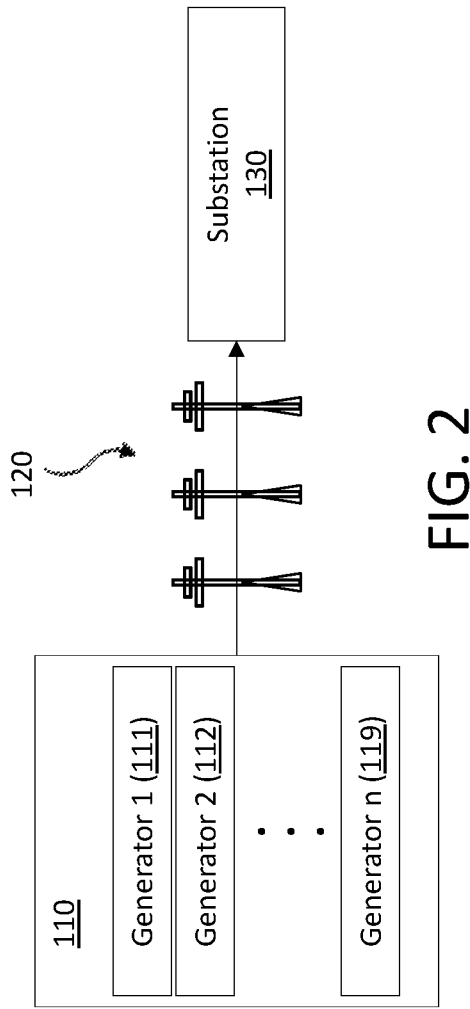
FIG. 2 is a simplified block diagram illustrating components of one embodiment of the power generation source of FIG. 5.
Figure 3:
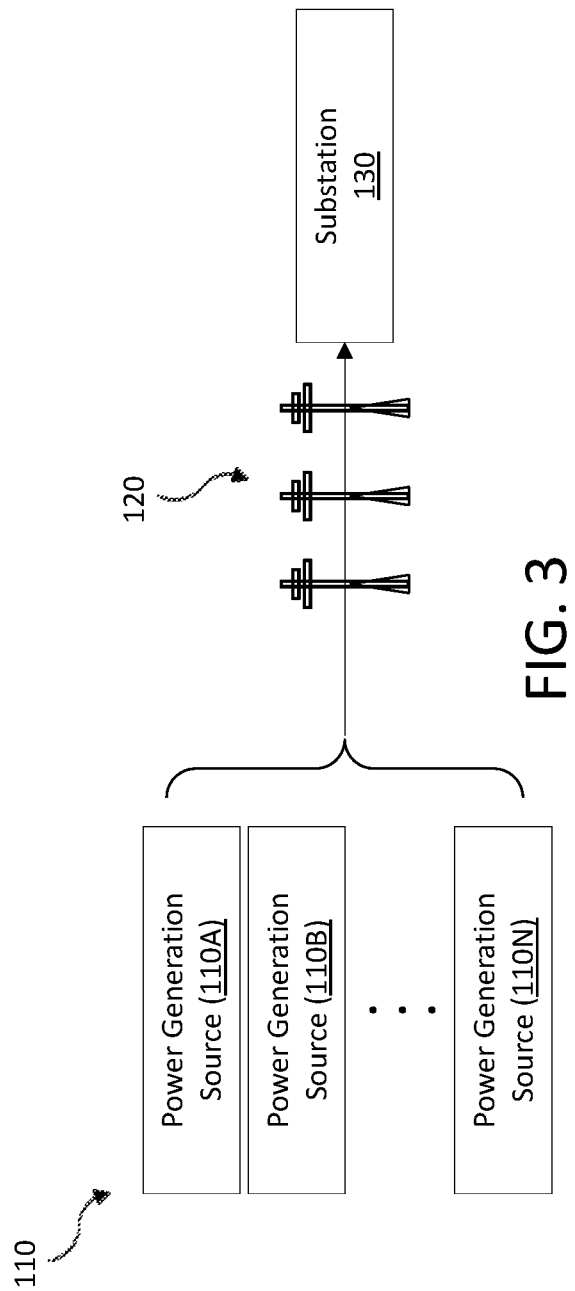
FIG. 3 is a simplified block diagram illustrating components of another embodiment of the power generation source of FIG. 5.

FIG. 2 is a simplified block diagram illustrating components of one embodiment, and FIG. 3 is a simplified block diagram illustrating components of another embodiment, of the power generation source 110 of FIG. 5. The overall functionality of source 110 in both of FIGS. 2 and 3 is substantially as set forth above with reference to FIG. 5. Similarly, construction, configuration, and operation of transmission lines 120 and substations 130 are substantially as set forth above.

As noted above, many facilities operated by electricity generation utilities either employ a plurality of generators (as illustrated in FIG. 2), operate in concert with each other or otherwise combine resources (as illustrated in FIG. 3), or both. In that regard, source 110 in FIG. 2 generally comprises a number, n, of electricity generator units (reference numerals 111, 112, and 119), whereas in the FIG. 3 implementation, source 110 generally comprises a number, N, of power generation facilities (reference numerals 110A, 110B, and 110N), each of which includes a generator unit. It will be appreciated that any or all of sources 110A, 110B, and 110N in FIG. 3 may be implemented in accordance with the FIG. 2 embodiment to include more than one generator unit.

FIG. 1 is a simplified block diagram illustrating components of an automated maximum sustained rate ("MSR") system operative to perform the disclosed methods. By way of example, in the FIG. 1 architecture, as well as that illustrated in FIG. 2, source 110 comprises three discrete electricity generator units 111, 112, and 119, though more or fewer of such units are contemplated. Each respective generator unit 111, 112, and 119 comprises a boiler 911, 912, and 913, a steam turbine 921, 922, and 923, an electric power generator 931, 932, and 933, and an exhaust stack 941, 942, and 943. As set forth in more detail below, operational parameters and real time functional characteristics of each of the foregoing components may be influenced by a respective unit controller 901, 902, and 903 which, in turn, may operate responsive to or otherwise in cooperation with a central generation control block 900.

Unit controllers 901, 902, and 903 and control block 900 may be implemented entirely in hardware, entirely in software, or in a combination incorporating both software and hardware aspects; in software implementations, suitable program code may be operative in conjunction with a computer employing or comprising, for example, a microprocessor, a microcontroller, or some other electronic hardware component as is generally known in the art. In that regard, unit controllers 901, 902, and 903 and control block 900 may be embodied in or comprise electronic hardware including computing devices, servers, data processing apparatus, programmable logic controllers, workstations or terminals, personal computers, laptops, notebook or tablet computers, touch pads, and the like. In particular, controllers 901, 902, and 903 and control block 900 may be configured and operative as what is generally known as a distributed control system (DCS) comprising computer servers, work stations, terminals, or a combination of these and other hardware components employed for the purpose of influencing or controlling operation of the elements illustrated in FIG. 1. In operation, controllers 901, 902, and 903 and control block 900 may, either individually or cooperatively, provide the control functionality set forth below, and the extent to which these elements interact and cooperate may be application- or implementation-specific. During emergencies, outages, or under other circumstances, it may be desirable that control block 900 provide centralized control functionality in cooperation with local resources; during local testing or routine operations, on the other hand, it may be desirable not to employ resources at centralized control block 900. Those of skill in the art will appreciate that various DCS tactics and methodologies may be employed as necessary or desired and as a function of operational characteristics of the various system components.

A user or administrator may program, code, update, debug, set defaults, or otherwise interact with unit controllers 901, 902, and 903 and control block 900 via any number of known user interfaces, input/output devices, and other communications technologies. The hardware enabling such interaction (such as keyboards, track pads, display panels, wireless radio transceivers, etc.) is not illustrated in FIG. 1 for clarity. The present disclosure is not intended to be limited by any specific hardware, operating systems and firmware, or communications infrastructure and protocols employed by the electronic control systems depicted in FIG. 1.

In practice, it may be desirable that like components of each generator unit 111, 112, and 119 be substantially identical in terms of architectural design and operational functionality, though it will be appreciated that each generator unit 111, 112, and 119 may differ from the others in some respects that do not render the following written description inapplicable. For instance, where boiler 911 and boiler 913 (or, e.g., turbine 921 and turbine 923) are different in design and functional characteristics, then certain required control inputs and the overall performance of generator unit 111 may differ from those of generator unit 119, though the operating principals of the control functionality, and thus the description, apply equally to both, despite their differences. Given this context, and solely to simplify the discussion, the description that follows is directed to a single generator unit 111, with the understanding that it may also apply to other generator units comprising or associated with source 110.

In operation, superheated steam from boiler 911 is used to drive turbine 921 which, in turn, rotates a shaft of generator 931 to produce alternating current electrical power; exhaust gases and other combustion by-products and filtering residue are expelled via stack 941. Various fluid and electrical conduit systems, heating elements, pressure regulators, valve and throttling mechanisms, and other system components are omitted from FIG. 1 for clarity, but are well known and understood by those of skill in the art. In that regard, conventional components or subsystems (such as 911, 921, and 931) may be used in the context of the present disclosure, and the operation of generator unit 111 and the interconnections between its various components generally comport with known principals. Specifically, the present disclosure is not intended to be limited by any particular brand, model, or manufacturer, or by any particular functional limitations or requirements, associated with boiler 911, turbine 921, generator 931, or stack 941 with the exception that irrespective of the specific hardware implementation that is employed at generator unit 111, the various components are responsive to unit controller 901 and are configurable and operative as set forth herein.

Figure 4:
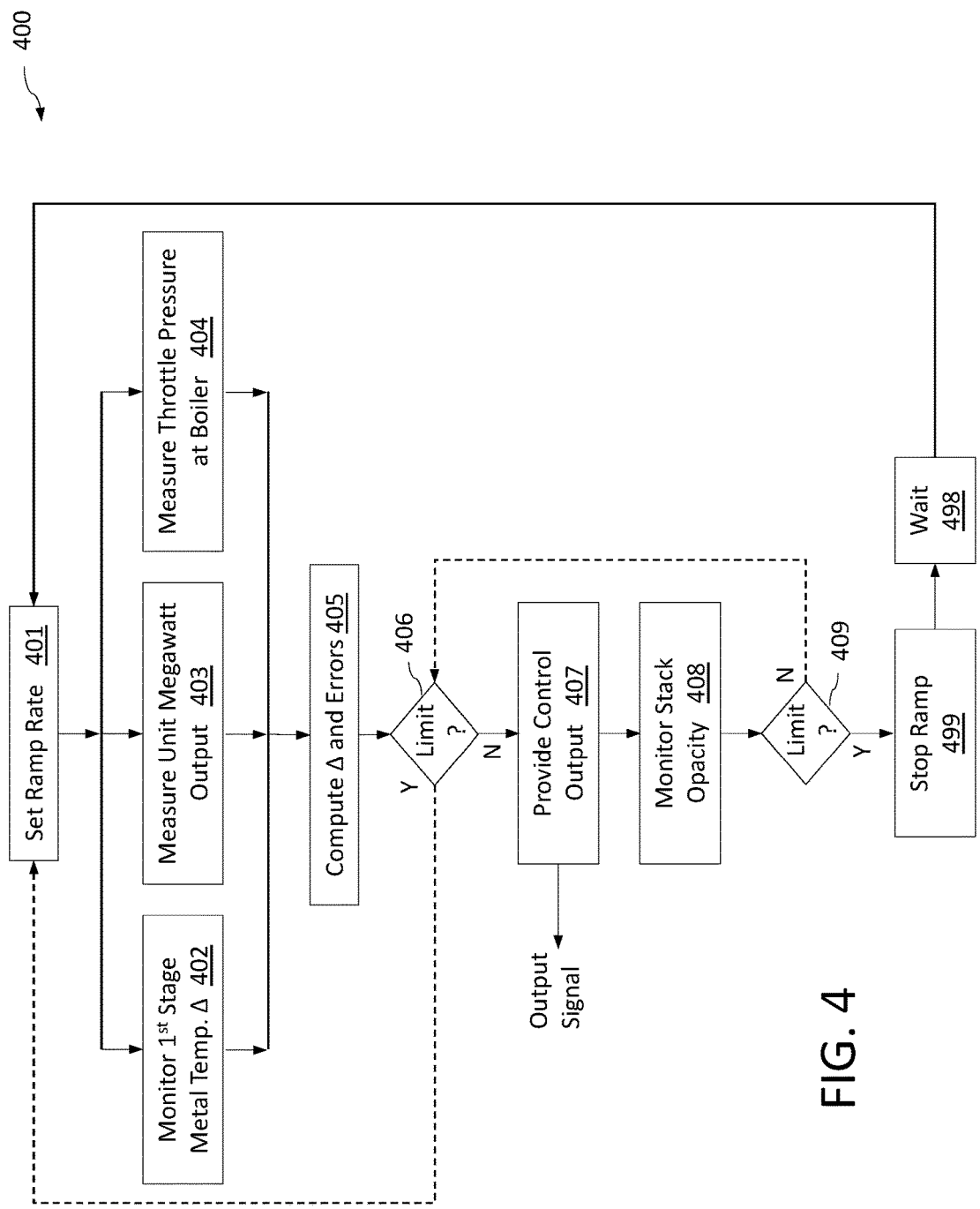
FIG. 4 is a simplified flow diagram illustrating a method of MSR control.

Turning now to operational control of the various components of FIG. 1, it is noted that FIG. 4 is a simplified flow diagram illustrating a method of MSR control. The process illustrated in FIG. 4 may generally be performed by, or responsive to instruction sets generated by or issued from, unit controller 901, either independently or in cooperation with control block 900. In that regard, unit controller 901 may operate in conjunction with control block 900 as desired to effectuate control functionality locally, where appropriate, or centrally, under certain circumstances. In particular, in certain emergency situations such as large scale outages, environmental disasters, or other enterprise-wide exigencies, it may be desirable that control block 900 provide operational commands—either as imperatives or suggestions—to unit controller 901 for the purpose of load balancing, routing around outages or damaged equipment, and the like. Additionally or alternatively, processing power considerations and equipment limitations may make distributed processing desirable or necessary depending upon the processing capabilities and computational bandwidth of unit controller 901, control block 900, or both. Further, commands from unit controller 901, DCS servers or other hardware (e.g., at or associated with control block 900 as set forth above), or both may be executed by or in connection with programmable logic controllers, embedded microprocessors, or other electronic devices associated with the individual components 911, 921, 931, and 941 to control valving systems, pressure regulators, cooling elements, and the like as is generally known in the art. These electronic devices are omitted from FIG. 1 for clarity, but the bi-directional data communications pathways for transmission of command signals, feedback, sensor data, and other electrical signals are generally depicted in FIG. 1 as dashed lines between the various components and unit controller 901. These data pathways may be wired or wireless, for example, and may be application-specific or selected as a function of the capabilities of the hardware implemented in cooperation with each of the components of generator unit 111.

A ramp rate may be set as represented at block 401. The ramp rate may be selected as a function of instantaneous load requirements as compared to the instantaneous output of generator unit 111, for instance, or based upon other criteria (e.g., during a test of the output capacity of generator unit 111, source 110, or both) and may be set by unit controller 901 on its own initiative or responsive to signals from control block 900. In practice, ramping from one output level to another may be positive (i.e., from a low power output level to a relatively higher output level) or negative (i.e., from a high power output level to a relatively lower output level). Responsive to the set ramp rate, unit controller 901 provides control signals to one or more of boiler 911, turbine 921, and generator 931 that are intended to adjust, control, or otherwise to regulate output of generator unit 111 such that it achieves equilibrium with the output setpoint in the shortest period of time.

Upon issuance of such control signals, the first stage metal temperature rate of change at turbine 921 may be measured or monitored (block 402), the megawatt output of unit 111 may be measured or monitored (block 403), and the operational throttle pressure at boiler 911 may be measured or monitored (block 404). As illustrated in FIG. 4, the foregoing operations may occur in parallel. In some applications, it may be desirable to obtain measurements multiple times per second, such as at a rate of 5 Hz down to about 2 Hz; alternatively, a measurement rate of once per second or once every five seconds may be employed for some applications (e.g., in connection with gradual or negative ramp rates). While illustrated in parallel for simplicity, the operations depicted at blocks 402-404 may occur serially, particularly where sampling frequencies are sufficiently high, and may be implementation- and hardware-specific, depending upon the capabilities of unit controller 901, control block 900 or other DCS hardware, and the limitations of the electronic elements associated with the various components of generator unit 111.

At block 402, the temperature of the structure at the first stage of turbine 921 may be acquired via a thermocouple, an infrared sensor, or other temperature sensing device as is generally known in the art. Many turbines include integrated temperature monitoring equipment (though the present disclosure contemplates after-market or third party temperature sensing apparatus), and many turbine manufacturers note or specify rates of change of the first stage metal that fall within normal, usual, anticipated, or time varying operational ranges for a particular model and implementation. The rate of change of first stage metal may be computed over time as indicated at block 405; this value may be indicative of stress on turbine 921, and may increase with increasing load and increasing ramp rates (e.g., as the output setpoint requires increasing work output from turbine 921). Whether or to what extent first stage temperature changes over time as measured and computed at blocks 402 and 405 may be employed at decision block 406 as set forth below.

At block 403, unit megawatt output of generator 931 may be measured in accordance with known principles, using any of various apparatus or equipment generally known in the art. One goal of source 110, in general, and generator unit 111, in particular, is to match electrical power output to a setpoint value representative of a system load (such as may be received from control block 900 or other DCS hardware components, for instance). To that end, megawatt output of generator 931 may be monitored, and any deviation from a setpoint value or other threshold may be computed at block 405 as set forth below. Similarly, at block 404, the throttle pressure at boiler 911 may be measured using any number of pressure sensors, valving systems, or other equipment as is generally known. Throttle pressure at boiler 911 may directly influence both temperature and pressure at boiler 911, as well as first stage metal temperature and other parameters at turbine 921. In that regard, any deviation in throttle pressure (as computed at block 405, e.g.) may ultimately affect operation and output of generator unit 111.

Data representing the foregoing and other operational parameters monitored and collected as indicated at blocks 402, 403, and 404 may be transmitted to unit controller 901. As noted above, the data communications implementation may be application-specific, depending upon the capabilities of any electronics associated or integrated with boiler 911, turbine 921, and generator 931. The data communications pathways may be wired or wireless, for instance, but the present disclosure is not intended to be limited by the nature of the transmission link or any particular data communications protocols.

Unit controller 901 may compute rates of change for measured data as well as any errors (e.g., deviations between instantaneous data and desired setpoint values) as indicated at block 405; as employed in the context of the present specification, the terms "error" and "discrepancy" generally refer to such a deviation or inconsistency between instantaneous values and setpoint values, and do not generally connote a "fault" or "failure" condition. In operation, unit controller 901 may compute both or either of i) rates of change for measured values and ii) discrepancies in instantaneous data values as compared to desired or targeted values for a specific parameter, where and as appropriate; in the case of first stage metal temperature at turbine 921, for example, it may be desirable to measure a rate of change, whereas in the case of throttle pressure at boiler 911, on the other hand, it may be desirable to compute a difference between the current value and a target value requested by a control signal. It will be appreciated, therefore, that the computations at block 405 may be application- or hardware-specific, and may be executed at varying rates, depending upon system output requirements, the structural and functional characteristics of hardware at generator unit 111, the reasons underlying the load ramp (e.g., system testing as opposed to a hardware failure, system emergency, or natural disaster), or a combination of these and other factors. Under some circumstances, it may be desirable to measure data and to perform calculations for each of the parameters coming from blocks 402, 403, and 404 once every second or twice every second, for example, while under other circumstances, such as with shallow ramps or when nearing steady state operations, it may be desirable to measure data and to perform calculations less frequently. Additionally, or alternatively, each of the parameters acquired in blocks 402, 403, and 404 may be measured at different sampling frequencies, and each computation at block 405 may be executed as desired without regard to the frequency of other computations or calculations.

In any event, relevant computations may be executed at block 405 by or under control of appropriate data processing resources at unit controller 901. In accordance with some implementations, if the rate of change of first stage metal temperature at turbine 921 exceeds a threshold (either positive or negative), unit controller 901 makes a note of this situation, such as by issuing a software flag, setting a bit in a hardware register, or via some other electronic mechanism generally known in the art. Similarly, where a discrepancy in megawatt output as compared to desired or setpoint output exceeds a threshold (e.g., where setpoint output minus instantaneous output exceeds a certain value), the unit controller 901 sets a flag or bit or otherwise acknowledges the error. Throttle pressure deviations from a setpoint value may also be computed and compared to a setpoint or desired value, and deviations exceeding a threshold or other value may be acknowledged as set forth above. Additionally or alternatively, it may be desirable that unit controller 901 or control block 900 react linearly or continuously, changing control signals to influence a target or desired MSR as the foregoing variables change in real time. Specifically, it is not necessary that the computations at block 405 or the determination at block 406 compare parameter values to a binary "threshold" or specific limiting value, per se, but rather may be implemented to be responsive to absolute values (irrespective of any comparison), rates of change, or other factors.

Those of skill in the art will appreciate that the computations at block 405 may be configured and modified as desired. For example, in some instances, algorithms at unit controller 901 may be configured to produce an alarm or an alert if a particular parameter value exceeds a maximum allowable, for instance if first stage metal temperature changes too quickly, or if throttle pressure gets too high. However, depending upon the structure of the algorithm and the nature of the computations, it may be true in some circumstances that unit controller 901 may be configured to produce an alarm or an alert if a particular parameter value drops below a minimum, for example, if a difference between instantaneous megawatt output and a setpoint is diminishing. Specifically, the decision block 406 may operate as a high-pass filter, a low-pass filter, or both, depending upon the nature of the calculations at block 405. In addition, as noted above, unit controller 901 may be in communication with control block 900, which may influence the nature of the computations at unit controller 901 or otherwise provide parameters that affect the threshold values and calculations executed locally at unit controller 901.

In the foregoing manner, errors (e.g., differences between desired output and instantaneous output) and rates of change of relevant parameters as computed at block 405 may be employed to influence operational characteristics of generator unit 111. Unit controller 901, responsive to the measured data and the comparisons of those data against a desired or setpoint value or other threshold (as well as any input from control block 900), may determine that a limit or threshold has been reached or exceeded as indicated at decision block 406. If a limit has been reached, and operational parameters are exceeding or threatening to exceed desired levels, the process may loop back to block 401, and new ramp rate may be set. As noted above, it will be appreciated that a new ramp rate may be set either higher or lower than a current ramp rate, depending upon the nature of the computations at block 405, the physical and theoretical limitations on system components 911, 921, and 931, the nature of any exigent circumstances affecting source 110, or a combination of these and other factors. In some implementations, a new ramp rate for a particular generator unit 111 may be set in accordance with instructions or suggestions received from control block 900, and may be provided with a view towards overall output or efficiency of source 110, as opposed to the specific operation of a particular generator unit 111, 112, or 119 in isolation.

In the event that a limit is not detected at decision block 406 (e.g., where all functional parameters are within acceptable operating ranges during a ramp), then control output may be provided at block 407. Such control output may provide signals to govern or otherwise to influence operation of boiler 911, turbine 921, generator 931, or a combination of these. In some circumstances, control signal output as depicted in FIG. 4 may be analog, if the particular system component is expecting such analog control signals. Alternatively, digital control signals may be utilized in the even that system component is equipped to handle digital input. Those of skill in the art will appreciate that a combination of analog and digital control signals may be output at block 407 in accordance with the electronics integrated with or associated with boiler 911, turbine 921, and generator 931. In operation, throttle pressure settings for boiler 911 or megawatt output settings for generator 931 may be transmitted as is generally known. These and other control signals may be provided in order to effectuate control of system components as desired or necessary for appropriate output of generator unit 111 in the context of a desired or requested power output level of source 110. The manner in which control signals are provided to system components is generally known in the art.

As generator unit 111 is ramping as described above, opacity of exhaust gases in stack 941 may be monitored as indicated at block 408. As is generally known, opacity is ordinarily a result of unburned fuel carried up stack 941, and can be created or exacerbated by an air/fuel mixture ratio error, equipment failure, insufficient filtering, or a combination of these and other factors. In that regard, stack opacity may be an indication of the amount of exhaust gases or filtering residue in stack 941 as a result of operation of boiler 911, and may be measured or monitored by any of various apparatus or sensors known in the art or configured and operative in accordance with known principles.

Where opacity is relatively high, for example, this opacity may be an indication of excess combustion gases or insufficient filtration as a result of a ramp rate that is not sustainable or otherwise exceeds the capacity of boiler 911. Where opacity is sufficiently low, however, the current ramp rate may be sustained or increased. In some implementations for certain embodiments of source 110, generator unit 111, or both, opacity limits may be specified by the Environmental Protection Agency (EPA) or other federal or local authorities; for example, opacity levels above 20% over a six minute average may require that a current ramp rate be reduced so as to lighten the short term load on boiler 911.

If opacity (as monitored at block 408) meets or exceeds a particular threshold as determined at decision block 409, then ramping may cease as indicated at block 499. As noted above with reference to blocks 405 and 406, whether a threshold is exceeded may be determined if a particular value for opacity is above or below (depending upon the nature of the measurements and algorithm-specific calculations) some predetermined or specified value. For example, if opacity is at or exceeds 20% over a six minute period, EPA standards may suggest that ramping boiler 911 should or must cease at block 499. Such a control signal ceasing the ramp may be issued from unit controller 901, and elements of generator unit 111 may enter a steady state operation or enter a mode of operation that accepts manual commands for further ramp procedures. Following a wait period 498, for example, the process may loop back to 401. Where stack opacity is within normal or acceptable ranges, then the process may loop back to decision block 406, where other system parameters are monitored for threshold considerations as set forth above.

Control procedures for generator units 112 and 119 may be substantially the same as those described above with reference to generator unit 111. Similarly, MSR control for sources 110A, 110B, and 110N may also follow the same flow as depicted in FIG. 4. While local control may be provided by unit controllers 901, 902, and 903, overall enterprise-wide monitoring and control functionality, i.e., coordination of multiple sources 110A, 110B, and 110N or individual generator units 111, 112, and 119, may be provided by control block 900.

In summary, a method of MSR control may set or adjust a ramp rate, monitor operating parameters at various system components such as turbine 921, generator 931, boiler 911, and stack 941, compute rates of change or other errors or discrepancies over time, and provide output signals as a result of the monitoring and computations. By way of example, consider a fleet of three 400 MW units such as may be implemented to support the bulk power supply for a small city. In some embodiments, the three units may be represented by generator units 111, 112, and 119 in FIGS. 1 and 2, or by sources 110A, 110B, and 110N in FIG. 3.

In this example, and considering conventional MSR approaches first, it is noted that each unit may be nominally capable of ramping from 100 MW to 400 MW and down at a predefined rate, say 4 MW/min. This means that, overall, a system of three units can support up to a system load ramping at no more than 12 MW/min and a peak load of 1,200 MW. A system load, increasing or decreasing, at a rate higher than 12 MW/min will result in a generation error that can only be corrected (using conventional technologies) by bringing more units online to support the load ramp.

If the steady state load is 200 MW (at the start of an increasing load ramp) and 600 MW (at the end of the load ramp), and the combination of generator units can ramp at 12 MW/min, then three of these units are required to control the ramp rate, but once a steady state is achieved at 600 MW, only two units are needed to satisfy requirements at steady state generation. That is, the resources required to ramp at an acceptable or optimal rate require that more units are brought online than are necessary to satisfy actual demand at steady state, resulting in inefficiency and unnecessary redundancy.

In accordance with the system and method set forth above, however, the ramp rate for each individual generator unit 111, 112, and 119 or source 110A, 110B, and 110N may be changed or controlled, e.g., from a nominal 4 MW/min to one that is closer to the operational limits of boiler 911 and turbine 921, eliminating the need to start three or more units (as in the example above) to satisfy the desired ramp rate when such resources will not be needed for the long term steady state load. Specifically, the systems and methods set forth herein are no longer limited to a fixed MSR as in conventional approaches, but may vary MSR between conventional low or guaranteed MSR (i.e., 4 MW/min common for all utilities) and a higher limit in an automated and controlled way.

As a result, a system and method as set forth herein may eliminate or minimize "slack" in the production and efficiency of generator units 111, 112, and 119 or sources 110A, 110B, and 110N, in particular, and in power generation source 110, in general. By selectively varying or increasing particular MSR targets to reflect limits that approach the maximum physical and operational limitations of the individual system components (as opposed to a conventional, "always safe" and simplistic limit that does not take into consideration the capabilities of the equipment), power generation source 110 generally deploys resources more efficiently. In many circumstances, removing or decreasing such slack may enable the disclosed system and method to ramp fewer resources quicker than conventional techniques, thus only the resources necessary or desired for steady state operation need to be activated to handle transient load conditions.

In that regard, unit controller 901, either independently or in cooperation with control block 900, may monitor the first stage metal temperature of turbine 921 and calculate the rate of change; responsive to this feedback, unit controller 901 may then modify the MSR, for instance, by setting a new ramp rate, and turbine 921 can be ramped at any rate up to and including a "never exceed" limit specified or recommended by the manufacturer or OEM (original equipment manufacturer). In one implementation, an initial ramp rate may be set at 15 MW/min, and as the output of generator 931 increases or decreases, the first stage metal temperature rate of change may be measured and the MSR adjusted downward so as never to exceed the limits of turbine 921.

In addition, the system may measure any difference between the megawatt demand (from control block 900, for example) and what generator 931 is actually delivering at any point in time or over a short period of time. As noted above, this difference is sometimes referred to as unit megawatt error. In accordance with some embodiments, the megawatt error MSR limit starts at 15 MW/min and decreases as output of generator 931 falls behind the power output level requirement or demand. This logic ensures that system demand is achieved while never letting system output fall far from the megawatt demand when at high ramp rates.

Further, as noted above, unit controller 901 may also measure throttle pressure error and, as long as the pressure is close to demand, generator unit 111 may be able to ramp at 15 MW/min. As the demand for generation results in high demand for steam flow (and the throttle pressure error increases), the instantaneous MSR is lowered until boiler 911 can recover. As will be appreciated, boiler 911 is always slower to react to input changes than turbine 921 and generator 931, so it can be important to monitor throttle pressure closely during ramping in order to approach the maximum operational limits of boiler 911; it is also more of a limitation when steam flow is increasing as opposed to decreasing, so it may be desirable to increase sampling rates on positive ramps as compared to negative ramps.

Finally, logic or instruction sets may be included to consider environmental limitations, e.g., related to opacity at stack 941. As noted above, if opacity equals or exceeds a limit or other threshold, then the megawatt demand may be frozen such generator unit 111 is no longer ramping up or down, and logic at unit controller 901 may introduce a delay until opacity decreases.

Returning now to the example above, and considering the disclosed method of varying MSR, each generator unit 111, 112, and 119 or source 110A, 110B, and 110N may support a higher (higher than a standard 4 MW/min) and selectively variable MSR; thus, only two units may be implemented to deliver generation of a 12 MW/min (~6 MW/min each) MSR. When steady load of 600 MW is reached, only two units are operating to deliver the needed megawatt output and ramp. Accordingly, a system and method as set forth herein, may reduce or eliminate the need to run three units in the short term in situations where two units will ultimately suffice to satisfy the desired ramp rate as well as to deliver power necessary for the total maximum steady state load.

As photovoltaic (solar) resources are added to the bulk power grid (such as illustrated in FIG. 5), the need to ramp utility sized units quickly is a growing issue. Accordingly, in addition to satisfying an existing need, the control block 900 of FIG. 1 will benefit from the ability to use a variable MSR as executed by unit controllers 901, 902, and 903 for the purpose of ramping resources quickly and efficiently.

The descriptions set forth above are meant to be illustrative and not limiting. Various modifications, in addition to those described herein, will be apparent to those skilled in the art from the foregoing description. Such modifications are also intended to fall within the scope of the concepts described herein. Each patent, patent application and publication cited or described in this document are hereby incorporated herein by reference, in their entireties.

The foregoing description of possible implementations consistent with the present disclosure does not represent a comprehensive list of all such implementations or all variations of the implementations described. The description of some implementation should not be construed as an intent to exclude other implementations. For example, artisans will understand how to implement the illustrative examples in many other ways, using equivalents and alternatives that do not depart from the scope of the disclosure. Moreover, unless indicated to the contrary in the preceding description, none of the components described in the implementations are essential to the arrangements disclosed. It is thus intended that the implementations be considered as illustrative, with a true scope and spirit of the disclosure being indicated by the following claims.

What is claimed is:

1. A method comprising:
   setting a ramp rate for an electric source;
   monitoring operating parameters at components of the source including one or more of a boiler, a steam turbine, an electric generator, and a stack;
   computing rates of change or discrepancies of the operating parameters over time; and
   providing output signals as a result of said monitoring and said computing selectively to control one of the boiler, the turbine, or the generator, wherein said setting a ramp rate comprises utilizing the output signals selectively to vary the ramp rate based on the operating parameters,
wherein said setting a ramp rate further comprises utilizing input from a distributed control system component remote from the electric source, and
wherein said setting a ramp rate further comprises utilizing input from a solar generator source having a solar unit controller in communication with the distributed control system component.

2. The method of claim 1 wherein the operating parameters include throttle pressure at the boiler, first stage metal temperature at the turbine, megawatt error at the generator, and opacity at the stack.

3. The method of claim 2 wherein said providing output signals comprises selectively transmitting the output signals to ones of the boiler, turbine, generator, and stack to control the operating parameters.

4. An electric power generation system comprising:
a generator source including a boiler, a steam turbine, an electric generator, and a stack, each of said boiler, turbine, generator, and stack comprising an associated control component;
a unit controller in communication with the associated control component at each of said boiler, turbine, generator, and stack; said unit controller configured and operative to perform a method comprising:
setting a ramp rate for said generator source, the ramp rate indicative of a change in output level of said generator;
receiving data representative of operating parameters from the associated control component at one or more of said boiler, turbine, generator, and stack;
computing rates of change or discrepancies of the operating parameters over time; and
providing output signals as a result of the receiving and the computing selectively to control one of said boiler, turbine, or generator;
an additional generator source, an additional unit controller, and a distributed control system component in communication with said unit controller and said additional unit controller; and
a solar generator source having a solar unit controller, wherein said distributed control system component is in communication with said solar unit controller, and setting a ramp rate comprises utilizing input from said solar unit controller.

5. The system of claim 4 wherein the operating parameters include throttle pressure at said boiler, first stage metal temperature at said turbine, megawatt error at said generator, and opacity at said stack.

6. The system of claim 5 wherein providing output signals comprises selectively transmitting the output signals to the associated control component at ones of said boiler, turbine, generator, and stack to control the operating parameters.

7. The system of claim 4 wherein setting a ramp rate comprises utilizing the output signals selectively to vary the ramp rate based on the operating parameters.

8. The system of claim 4 wherein, for each of said unit controller and said additional unit controller, setting a ramp rate comprises utilizing input from said distributed control system component.

9. The system of claim 8 wherein the setting a ramp rate further comprises utilizing, at said distributed control system component, the output signals from said unit controller selectively to vary the ramp rate at said additional generator source.

10. A method of utilizing resources at an electric power generation facility, said method comprising:
employing a plurality of electric power sources, each of the plurality of power sources including a boiler, a steam turbine, an electric generator, a stack, and a unit controller;
providing a distributed control system component remote from the electrical power sources and in communication with the unit controller at each of the plurality of power sources;
for each of the of power sources:
setting a ramp rate, the ramp rate indicative of a change in output level of said generator;
monitoring operating parameters of one or more of the boiler, turbine, generator, and stack;
computing rates of change or discrepancies of the operating parameters over time; and
providing output signals as a result of said monitoring and said computing selectively to control one of the boiler, the turbine, or the generator,
wherein said setting a ramp rate comprises utilizing the output signals selectively to vary the ramp rate based on the operating parameters,
wherein said setting a ramp rate further comprises utilizing input from the distributed control system component, and
wherein said setting a ramp rate further comprises utilizing input from a solar generator source having a solar unit controller in communication with the distributed control system component; and
receiving, at the distributed control system component, responsive to said monitoring, said computing, and said providing, data representative of the operating parameters at each of the plurality of power sources.

11. The method of claim 10 wherein the operating parameters include throttle pressure at the boiler, first stage metal temperature at the turbine, megawatt error at the generator, and opacity at the stack.

12. The method of claim 11 wherein said providing output signals comprises selectively transmitting the output signals to ones of the boiler, the turbine, the generator, and the stack to control the operating parameters.

13. The method of claim 10 wherein said setting a ramp rate comprises utilizing the output signals selectively to vary the ramp rate based on the operating parameters.

14. The method of claim 13 wherein said setting a ramp rate further comprises utilizing input from the distributed control system component.

15. The method of claim 14 wherein said setting a ramp rate for each of the plurality of power sources comprises utilizing the operating parameters from each of the others of the plurality of power sources.

16. The method of claim 15 wherein said setting a ramp rate further comprises maximizing ramp rate for a number of the plurality of power sources necessary to satisfy a steady state load.

* * * * *